United States Patent [19]
Kobori et al.

[11] 4,290,674
[45] Sep. 22, 1981

[54] APPARATUS FOR ESTABLISHING AUTOMATIC EXPOSURE CONTROL MODES IN EXCHANGEABLE LENS CAMERA

[75] Inventors: Toshio Kobori, Sakai; Masayoshi Sahara, Sennan, both of Japan

[73] Assignee: Minolta Camera Kabushiki Kaisha, Osaka, Japan

[21] Appl. No.: 106,269

[22] Filed: Dec. 21, 1979

[30] Foreign Application Priority Data

Dec. 29, 1978 [JP] Japan .................. 53-163125

[51] Int. Cl.³ ........ G03B 7/087; G03B 7/20; G03B 17/18
[52] U.S. Cl. .................. 354/38; 354/60 L
[58] Field of Search .............. 354/29, 354/30, 36-38, 53, 60 E, 60 L, 286, 289

[56] References Cited

U.S. PATENT DOCUMENTS

| 3,829,867 | 8/1974 | Ono | 354/29 |
| 4,037,235 | 7/1977 | Ueda | 354/38 |
| 4,118,726 | 10/1978 | Kuramoto | 354/289 |
| 4,140,380 | 2/1979 | Ueda et al. | 354/60 L |
| 4,150,889 | 4/1979 | Ueda et al. | 354/37 |

Primary Examiner—L. T. Hix
Assistant Examiner—William B. Perkey
Attorney, Agent, or Firm—Watson, Cole, Grindle & Watson

[57] ABSTRACT

A lens exchangeable camera has two automatic exposure control modes, one of which is a program exposure control mode and the other of which is an aperture priority automatic shutter speed control mode. The program exposure control mode is selected when a diaphragm presetting ring on an exchangeable lens mounted on the camera is set to a position to preset a minimum aperture size or maximum f-number. The aperture priority automatic shutter speed control mode is selected when the diaphragm presetting ring is set to a position to preset an aperture size other than the minimum aperture.

6 Claims, 8 Drawing Figures

APPARATUS FOR ESTABLISHING AUTOMATIC EXPOSURE CONTROL MODES IN EXCHANGEABLE LENS CAMERA

FIELD OF THE INVENTION

The present invention relates to camera apparatus for performing automatic exposure control, and more particularly to such camera apparatus adapted for use with exchangeable lenses to obtain either automatic programmed exposure control or aperture priority automatic shutter speed control by suitable positioning of a diaphragm presetting ring or similar device.

BACKGROUND OF THE INVENTION

There has been a marked tendency in recent years for highly versatile cameras using exchangeable lenses (hereinafter called lens exchangeble cameras) to have a selectable plurality of automatic exposure control modes for increasing the exposure functions available to the camera operator. While such functional enhancement or improvement is itself welcome, at the same time, it increases the number of necessary operating steps for photographic preparations, thereby resulting in increased difficulty for camera operators, and especially inexperienced camera operators.

For example, lens exchangeable cameras have been proposed which can optionally be set either to an aperture priority automatic shutter speed control mode, a shutter speed priority automatic aperture control mode or an automatic programmed exposure control mode. With these types of cameras, a mode changeover is made possible by setting a diaphragm presetting means, provided on an exchangeable lens, to an AUTO position, and by setting a mode selector lever, provided on the camera body, to any required MODE position. Moreover, setting a dial provided on the camera body to an f-number or a shutter speed to be preferentially set, or to a programmed position, is required to photograph in an actually selected mode. Such a lens exchangeable camera is described at pages 68 and 69 of the Japanese Publication, PHOTOGRAPHIC INDUSTRIES, published on June 1, 1978.

Additionally, U.S. Pat. No 4,167,313 describes camera apparatus using an electromagnetic diaphragm mechanism that is optionally settable by the camera operator to one of four photographing modes, including manual photography, automatic photography with a preset diaphragm aperture, automatic photography with a preset exposure period, and automatic programmed photography.

In the automatic photographic mode with preset diaphragm aperture (diaphragm aperture priority) a mode selection knob is manually turned until an indication "AA" is aligned with an index to establish the necessary setting of an arrangement of mode selection switches. The camera operator is also required to set the diaphragm setting by manual rotation of a diaphragm setting ring. In the automatic, programmed photographic mode, the mode selection knob is turned until an indication "PA" is aligned with the associated index. The camera operator is also required to operate a "programmed condition changeover knob", to complete the setting of this operational mode.

SUMMARY OF THE INVENTION

It is a primary object of the present invention to provide a lens exchangeable camera that is selectively settable to at least two automatic exposure control modes, namely, an automatic programmed exposure control mode and an aperture priority automatic shutter speed control mode, and wherein the camera setting manipulations are simplified and made easier, both for non-experienced and experienced camera users.

The lens exchangeable camera is characterized in that a changeover to either of the at least two automatic exposure control modes only requires a diaphragm presetting operation using a diaphragm preset means. More specifically, when the maximum f-number, representative of the minimum aperture of an exchangeable lens, is preset using a diaphragm presetting means, the camera is thereby set to an automatic programmed exposure control mode, i.e., the camera functions in an automatic exposure control mode where the diaphragm aperture and shutter speed settings are automatically determined in dependence upon detected scene brightness. When an f-number other than the maximum f-number is preset by manual operation of the diaphragm presetting means, the camera is arranged such that its exposure control mode is changed over to function in an aperture priority automatic shutter speed control mode, wherein the priority information is the preset f-number.

The camera in accordance with the present invention is capable of changing between at least two automatic exposure control modes by only selecting the maximum f-number representative of the minimum aperture or by only selecting any other aperture using a diaphragm preset means. When the maximum f-number is preset, a photographer only has to press the shutter button after focusing to obtain optimum exposure. However, when any f-number or aperture setting other than the maximum f-number is preset, exposure is controlled by a shutter speed commensurate with the preset aperture. The only operation to be performed by the operator is the depression of the shutter release button on the camera body, thereby making camera handling extremely simple.

The above and other objects and features of the present invention will become more apparent from the following description taken in connection with the accompanying drawings.

DESCRIPTION OF A PREFERRED EMBODIMENT

FIGS. 1 through 4 show an embodiment of the present invention applied to a single-lens reflex camera having a photosensitive means receiving scene light through the lens of the camera (TTL light measuring system); a suitable exchangeable lens is mountable to the camera body.

Figure 1:
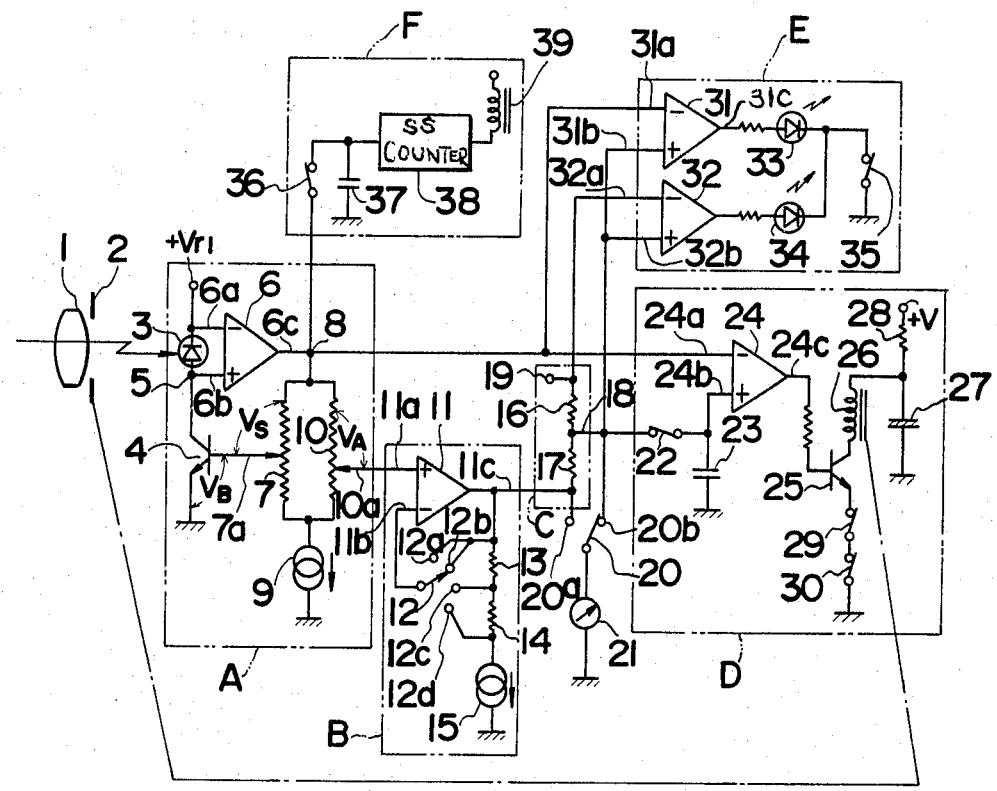
FIG. 1 is an electric circuit diagram of a camera according to an embodiment of the present invention.

FIG. 1 shows the electric circuitry for carrying out the invention, and comprises light measuring circuit A, signal correction circuit B for generating an optimum exposure signal for a specific f-number setting, programmed shutter signal generating circuit C, aperture control circuit D, warning display circuit E for displaying warning beyond the range of the programmed shutter control, and shutter speed control circuit F.

In light measuring circuit A, photodiode 3 measures scene light passing through lens 1 and diaphragm 2, and logarithmic compression transistor 4 generates, across the base-emitter thereof, a voltage proportional to the logarithm of the collector current thereof which is the photocurrent of photodiode 3. The positive input of high input impedance amplifier 6 is connected to node 5 of the junction of the anode of photodiode 3 and the collector of transistor 4, and the negative input of amplifier 6 is connected to the cathode of photodiode 3 and the +Vrl power supply voltage. Output 6c of amplifier 6 is connected through potentiometer 7 to the base of transistor 4 for negative feedback to amplifier 6. Slider 7a of potentiometer 7 is set to a position commensurate with the film sensitivity. Slider 10a of potentiometer 10 slides in conjunction with the movement of a diaphragm preset means (not shown in FIG. 1), and the resistance between node 8 and slider 10a is proportional to the step difference between the minimum f-number or fully open aperture and a preset aperture of the exchangeable lens. Constant current flows from constant-current source 9 through potentiometers 7 and 10. In the above circuit, the base-emitter voltage VB of transistor 4 is proportional to the logarithm of the intensity of the scene light which photodiode 3 detects, and voltage VS, commensurate with the set film sensitivity between terminals 7a and node 8, is added to voltage VB to produce a voltage Vt (VB+VS) at node 8. Signal voltage Vt indicates that a shutter speed is suitable for the aperture at the time of light measurement. Therefore, when the diaphragm is in a fully open state, voltage Vt is that shutter speed signal suitable for the maximum aperture. Futhermore, the voltage at slider 10a is obtained by subtracting voltage VA (between node 8 and slider 10a) from voltage Vt. The voltage at slider 10a of potentiometer 10 is a signal indicative of that shutter speed suitable for the preset aperture value.

Signal correction circuit B, comprising operational amplifier 11, changeover switch 12, resistors 13 and 14 and constant-current power supply 15 generates an optimum shutter speed signal for an aperture of F16 at all times, regardless of the maximum f-number of the exchangeable lens actually used, from output terminal 11c of operational amplifier 11, and at the same time, functions as an impedance converter circuit for the voltage output from terminal 10a. Changeover switch 12 is constructed such that when the minimum aperture is preset, contacts 12b, 12c and 12d are respectively selected for exchangeable lenses having maximum f-numbers of F16, F22 and F32. When any f-number other than the maximum f-number is preset, contact 12a is selected. The resistances of resistors 13 and 14 and the current of constant-current power supply 15 are determined so that a voltage (about 18 mV at 25° C.) equal to a change for one step in exposure value in the base-emitter voltage of transistor 4 is generated from respective opposite terminals of resistors 13 and 14. When the maximum f-number is preset, a shutter speed signal suitable for the maximum f-number is input to terminal 11a of operational amplifier 11, and a voltage of the same level as the shutter speed signal appears at input terminal 11b through the feedback reaction of operational amplifier 11. Therefore, when an exchangeable lens whose maximum f-number is F32, for example, is used, changeover switch 12 is in contact with contact 12d, at which a shutter speed signal suitable for f-number F32 apears at terminal 11d, causing a shutter speed signal suitable for f-number F16 (two steps higher than f-number F32) to appear at output terminal 11c. It should be understood that when any f-number other than the maximum f-number is preset, a shutter speed signal suitable for the preset f-number is generated from output terminal 11c as is more fully described hereinafter.

Figure 2:
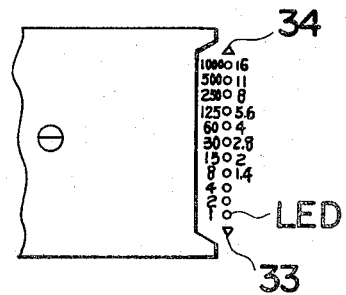
FIG. 2 is an illustration of an indicator inside a viewfinder of the camera.
Figure 5:
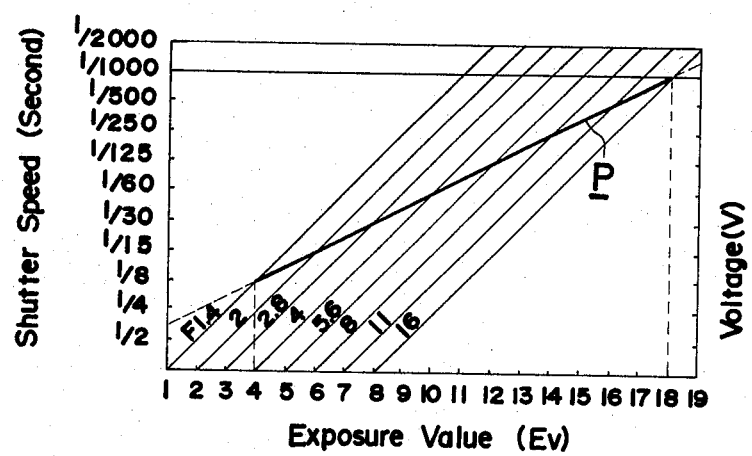
FIG. 5 is a graph showing a voltage generated from terminal 18 in FIG. 1 for automatic programmed shutter control.

Resistors 16 and 17 constitute programmed shutter signal generating circuit C, and the resistances of resistors 16 and 17 are set equally, for example. A high-speed shutter signal, e.g., a current corresponding to 1/1000 second is supplied from a constant-current power supply (not shown) to terminal 19 of resistor 16. With the maximum f-number preset, a voltage signal indicated by straight line P in the graph of FIG. 5 is generated from terminal 18 at the junction of resistors 16 and 17. Straight line P passes through a point of shutter speed 1/1000 second and f-number F16 when scene brightness and the set film sensitivity provide an exposure value EV equal to 18 (EV=18), thereby indicating a program wherein as the exposure value decreases by 2EV, the shutter speed is slowed by one step and the aperture is opened by one step. It is to be noted that a programmed shutter signal indicated by straight line P is generated when the diaphragm is in the fully open state, and when the diaphragm is stopped-down from the minimum f-number, or when incident light detected by photodiode 3 is shut off by the well-known movement of a mirror inside the camera body, the programmed shutter signal is no longer effected. Changeover switch 20 is linked with the diaphragm presetting means (to be described, infra) and is constructed such that contact 20a is selected when the maximum f-number is preset, and contact 20b is selected when any other f-number is preset. Indicating means 21 is used to indicate the shutter speed and the f-number to be controlled in an automatic programmed exposure control mode and the shutter speed in the aperture priority automatic shutter speed control mode, a meter or digital display being used for the indicating means. FIG. 2 shows an exemplary indicator, of a dot type digital display usable as the indicating means, and each dot consists of a light emitting diode (LED). It should be noted that an output voltage based on a ground potential from terminal 11c or 18 is a signal for indicating a shutter speed, and a shutter speed in either of the above two modes can be indicated by a single shutter speed indicating means, in accordance with techniques well known to those skilled in the art.

In the programmed shutter mode, an f-number is given to each individual corresponding shutter speed, in principle, and as shown in FIG. 2, for example, the indication of an f-number and a shutter speed can be made using a common LED.

In aperture control circuit D, switch 22, one contact of which is connected to terminal 18, is constructed such that it is opened immediately before the initiation of the stopping-down of lens diaphragm 2 in response to the shutter release operation. With switch 22 opened, a voltage signal for an automatic programmed exposure control is maintained and stored by capacitor 23.

A circuit consisting of voltage comparator circuit 24, transistor 25, electromagnet 26, and capacitor 27 determines a diaphragm aperture in accordance with the voltage signal maintained by capacitor 23. That is, lens diaphragm 2 is stopped-down from the fully open position towards an aperture corresponding to the preset f-number in response to the shutter release operation, and the output voltage 6c at node 8 during stopping-down of lens diaphragm 2 is applied to one input 24a of voltage comparator circuit 24, and when that changing input voltage level becomes equal to the other input voltage level at input 24b, i.e., the voltage held by capacitor 23, the output of voltage comparator circuit 24 is inverted, and electromagnet 26 is activated to restrain the stopping-down operation of lens diaphragm 2, thereby determining the diaphragm aperture. The operation of electromagnet 26 to effect the aforementioned operation is well known to those skilled in the art. Capacitor 27 is pre-charged through resistor 28 from voltage source +V, and when transistor 25 is turned on in response to the inversion of the output from voltage comparator circuit 24, capacitor 27 is discharged through the coil of electromagnet 26. Switch 29, connected to the emitter of transistor 25, is constructed such that it is closed immediately before the diaphragm is stopped-down in response to the shutter release operation, and is opened upon completion of exposure. Switch 30 links with a diaphragm preset means (to be described, infra) and is closed only when the maximum f-number is preset.

Warning indicating circuit E comprises voltage comparator circuits 31 and 32, and LEDs 33 and 34. When the automatic programmed control mode is set, the voltage at input 31a of voltage comparator circuit 31 is lower than input 31b in a scene brightness area where the optimum aperture is larger than the fully open aperture (with reference to the graph of FIG. 5, for example, an area where the exposure value is not more than 4EV for a lens with a minimum f-number of F14). Thereby, output 31c of voltage comparator circuit 31 switches to a high level, thereby causing LED 33 to light. Furthermore, in the area where the exposure value is more than 18EV, the voltage at input 32a of voltage comparator circuit 32 becomes higher than that at input 32b, thereby causing LED 34 to light. It should be understood that switch 35, connected between the cathode and ground of LEDs 33 and 34, is opened for exposure control modes other than the programmed mode (similar to the operation of switch 30 described, supra) to prevent warning indicating operation.

In shutter speed control circuit F, memory switch 36, one contact of which is connected to the output of amplifier 6, is opened after the diaphragm aperture has been determined as a predetermined value, and the light measurement of scene light passing through the determined aperture is stored in memory capacitor 37 when memory switch 36 is opened. Shutter speed counting circuit counts time commensurate with the voltage stored by memory capacitor 37 in response to commencement of exposure, and de-energizes electromagnet 39 upon completion of counting time, thereby starting the shutter closure.

Figure 3:
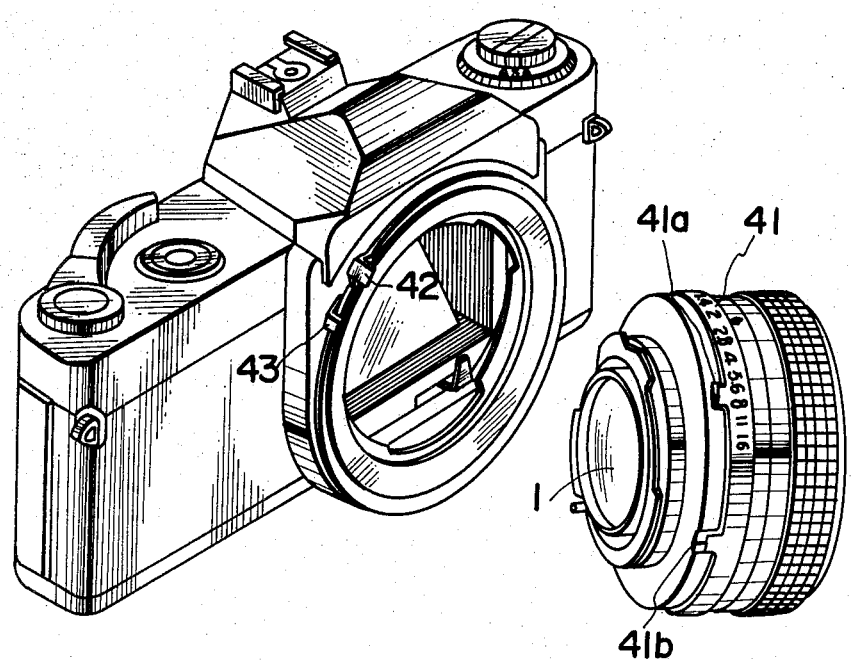
FIG. 3 is a perspective view of a camera body and an exchangeable lens attachable thereto.

FIG. 3 shows a camera body and an exchangeable lens in an exemplary embodiment of the present invention, and diaphragm presetting means 41 of the exchangeable lens has engagement elements 41a and 41b, respectively engageable with members 42 and 43 on the camera body.

FIGS. 4a–4d show various connecting relationships between engagement element 41a and engaging member 42, and engagement element 41b and engaging member 43 when the exchangeable lens is mounted at a predetermined position relative to the camera body.

Engagement element 41a is positioned at a given distance away from the minimum f-number graduation on diaphragm preset means 41 in the rotational direction thereof regardless of the minimum f-number of the exchangeable lens, and the amount of rotation or movement of engagement element 41a when diaphragm presetting means 41 is preset to any desired f-number corresponds to a step difference in f-number from the minimum f-number to the preset f-number. Engaging member 42 carries slider 10a of potentiometer 10, and is biased by spring 44 to engage engagement element 41a at all times, and follows engagement element 41a, thereby causing slider 10a to slide over potentiometer 10.

Figure 4A:
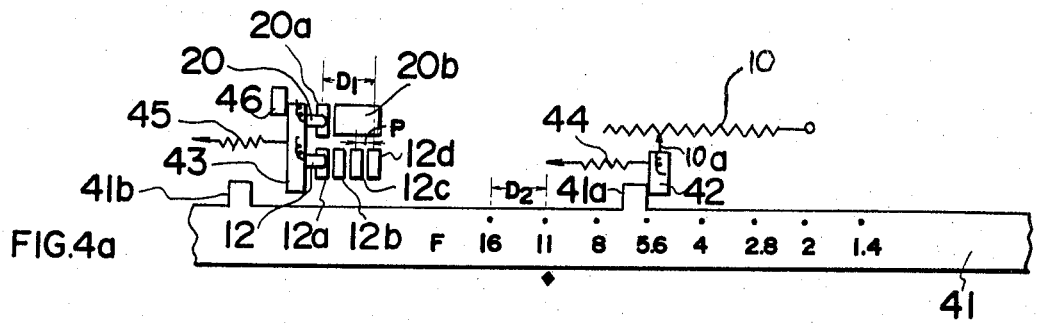
FIGS. 4a, b, c and d show the connections between the camera body and the diaphragm preset means of the exchangeable lens.
Figure 4B:
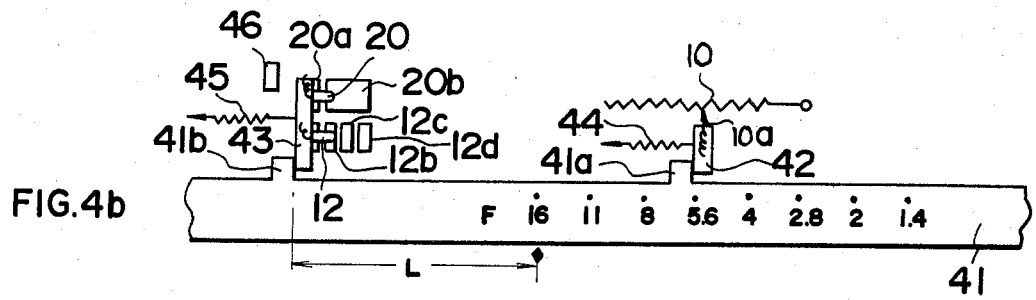
Figure 4C:
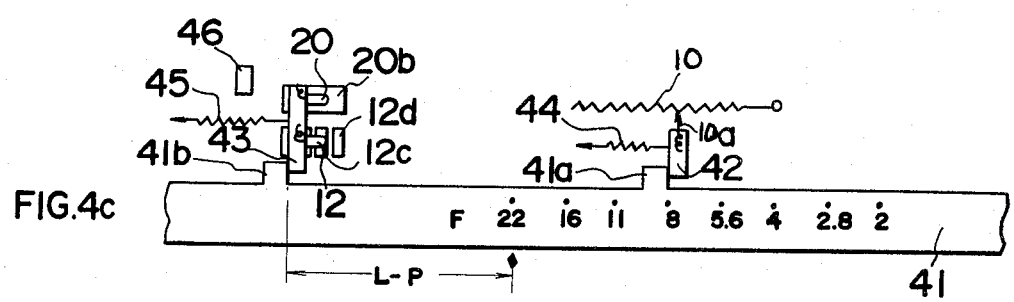
Figure 4D:
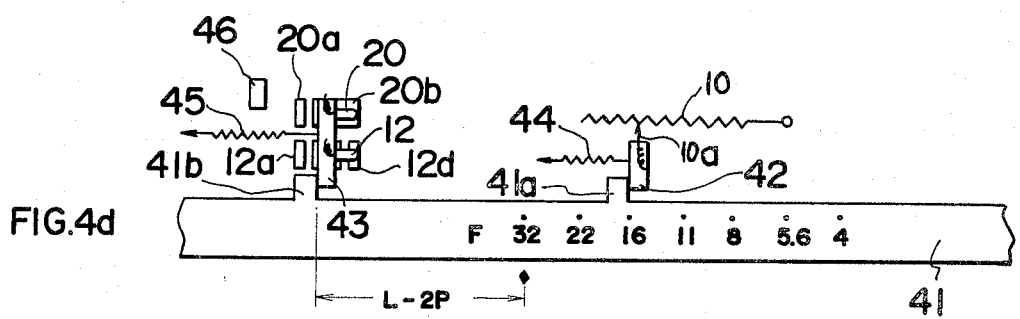

Engaging member 43 is biased by spring 45, and when the exchangeable lens diaphragm preset means 41 is set to any f-number other than the maximum f-number, engaging member 43 abuts on stopper 46, as shown in FIG. 4a. The movable contacts 12', 20' of switches 12 and 20 are respectively mounted on engaging member 43 and fixed contacts 12a, 12b, 12c, 12d and 20a and 20b are mounted on the camera body in operative relation to the respective movable contacts 12' and 20' of switches 12 and 20. The layout interval D1 between contacts 12a and 12d is set equal to setting interval D2 between the steps of the f-number graduations on diaphragm presetting means 41. The adjacent intervals P between the center line of contacts 12a, 12b, 12c and 12d are determined as D1/3=P. Engagement element 41b is positioned at a distance (depending on the maximum f-number) away from the maximum f-number graduation on diaphragm presetting means 41, and when diaphragm presetting means 1 is preset to the maximum f-number, engagement element 41b is shifted to a position dependent on the maximum f-number. Specifically, with an exchangeable lens having a maximum f-number of F16, engagement element 41b shifts engaging member 43 to a position where movable contact 12' of switch 12 comes into contact with contact 12b when the diaphragm is preset to F16, as shown in FIG. 4b. With an exchangeable lens with a maximum f-number of F16, if the distance from the position of graduation F16 to engagement element 41b on diaphragm presetting means 41 is assumed to be L (as shown in FIG. 4b), then engagement element 41b for exchangeable lenses with maximum f-numbers of F22 and F32 is positioned at distances L-P and L-2P, respectively, away from the positions of the maximum f-number graduation (as shown in FIGS. 4c and 4d, respectively). Therefore, movable switch contact 12' is changed over to contact 12a, as shown in FIG. 4a, when any f-number other than the maximum f-number is preset; and when the maximum f-number is preset, movable switch contact 12' is changed over to contacts 12b, 12c and 12d depending on the respective maximum f-number of an exchangeable lens, as shown in FIGS. 4b, c and d.

However, fixed contact 20a of switch 20 is positioned to correspond to fixed contact 12a of switch 12, and fixed contact 20b is positioned to correspond to fixed contacts 12b, 12c and 12d. Therefore, movable switch contact 20' is changed over to contact 20a when any f-number other than the maximum f-number is preset, as shown in FIG. 4a, whereas movable switch contact 20 is changed over to contact 20b when the maximum f-number is preset, as shown in FIGS. 4b, c and d.

It is to be noted that switches 30 and 35 (not shown in FIGS. 4a-4d) are identical in construction to switch 20, their movable contacts being mounted on engaging member 43 and their fixed contacts being provided on the camera body to correspond only to fixed contact piece 20a.

The operation of the above described embodiment is as follows. For selecting an automatic programmed exposure control mode, diaphragm presetting means 41 of the exchangeable lens mounted on the camera body is operated to preset the maximum f-number of the lens. This causes switch 20 to be changed over to contact 20b, and switches 30 and 35 to be both closed. Moreover, switch 12 is changed over to one of contacts 12b, 12c or 12d depending on the maximum f-number of the exchangeable lens.

When power is supplied to the circuitry of FIG. 1 in the stage before the shutter release operation, an optimum shutter speed signal for an aperture of F16 appears at output terminal 11c of operational amplifier 11, regardless of the maximum f-number of the exchangeable lens. As previously described, the voltage at terminal 19 corresponds to a shutter speed of 1/1000 second and voltage output 11C corresponding to optimum shutter speed for an aperture of F16 is applied to the terminal of resistor 17. Thus, the voltage across dividing resistors 16 and 17 is the difference between a shutter speed of 1/1000 second and the optimum shutter speed corresponding to an aperture of F16. That voltage difference divided by resistors 16 and 17 is the voltage at node 18. That is, a voltage on straight line P of FIG. 5 appears at node 18. This voltage is maintained and stored by capacitor 23 when switch 22 is opened in response to the shutter release operation.

When lens diaphragm 2 is stopped-down in response to the shutter release operation, the voltage applied to one input 24a of voltage comparator circuit 24 starts to decrease. When the voltage at input 24a and the voltage at input 24b, which is the charged potential of capacitor 23, coincide with each other, the output of voltage comparator circuit 24 becomes high, whereby transistor 25 turns on to cause the coil of electromagnet 26 to be activated, thereby stopping the stopping-down of the diaphragm to determine the aperture. Then, switch 36 is opened, causing a voltage corresponding to the light measurement resulting from scene light passing through the determined aperture to be maintained and stored by capacitor 37, and shutter speed counting circuit 38 counts time commensurate with the stored voltage upon shutter opening. The completion of counting causes the coil of electromagnet 39 to be activated, whereby the shutter is closed.

Therefore, in the above-described mode, exposure control is automatically carried out by a combination of the shutter speed and the f-number based on the program indicated by straight line P of FIG. 5.

It should be understood that the shutter speed and the f-number to be controlled are indicated by indicating means 21 (of FIG. 1), and if an indicating means of the type in FIG. 2 is used, for example, either one of the LEDs thereof emits light.

When scene brightness is also beyond the range of the programmed control, either of LEDs 33 and 34 emits light for warning.

For selecting the aperture priority automatic shutter speed control mode, diaphragm presetting means 41 of the exchangeable lens is operated to preset any f-number other than the maximum f-number of the exchangeable lens. This causes switch 20 to be changed over to contact 20b, and at the same time, switches 30 and 35 to be opened, whereby aperture control circuit D and warning indicating circuit E become inoperative. Switch 12 is also changed over to contact 12a.

Therefore, when power is supplied to the circuitry of FIG. 1 in the stage before the shutter release operation, a signal corresponding to a shutter speed suitable for the preset f-number is obtained at output terminal 11c of operational amplifier 11, and based on this voltage, indicating means 21 indicates optimum shutter speed. However, the shutter release operation causes the stopping-down of the diaphragm to be performed, and lens diaphragm 2 is set to an aperture corresponding to the preset f-number by known means (not shown) provided in the exchangeable lens. And similar to the automatic programmed control mode, a voltage corresponding to the light measurement resulting from detection of scene light passing through the preset aperture is maintained and stored by capacitor 37; and based on this voltage, the shutter speed is automatically determined by shutter speed counting circuit 38.

Thus, in the above embodiment, an automatic programmed control mode and an aperture priority automatic shutter speed control mode are selectable only by operating diaphragm presetting means 41 of an exchangeable lens mounted to the camera body, thereby making photography in a selected mode immediately possible.

It should be noted that switches 12, 20, 30 and 35 are all of the contact type in the above described embodiment, but only switch 12 need be of the contact type, and the other switches may be contactless, e.g. replaced by transistor circuitry, to be controlled by a change-over signal of switch 12.

As described in connection with the embodiment of the present invention, the lens exchangeable camera according to the present invention, upon receipt of the signal that the diaphragm preset means of the exchangeable lens is in a preset state for the maximum f-number, automatically selects a programmed exposure control mode, whereas an aperture priority automatic control mode is automatically selected with any f-number other than the maximum f-number preset.

Thus, the lens exchangeable camera according to the present invention makes it possible to change-over the exposure control modes from automatic programmed control to aperture priority automatic shutter speed control, and vice-versa, only by manual operation of a diaphragm presetting means of an exchangeable lens. Therefore, both inexperienced and experienced camera users can more readily and easily photograph in the above two modes, as contrasted with the operation of known lens exchangeable cameras.

What is claimed is:

1. A lens exchangeable camera adapted for mounting an exchangeable lens having a diaphragm, a diaphragm presetting means settable to preset a diaphragm aperture size, and an aperture information transmitting means capable of transmitting respective first and second aperture information, said first aperture information representing that the diaphragm presetting means is preset at a minimum aperture size and said second aperture information representing each setting of the diaphragm presetting means other than the minimum aperture setting, said camera comprising:

a program exposure control circuit for generating signals adaptable to automatically control the diaphragm aperture size of said lens and to automatically control the shutter speed under a given program in accordance with scene brightness;

an aperture priority automatic shutter speed control circuit for automatically controlling the shutter speed in accordance with scene brightness measured through the diaphragm aperture actually stopped-down to the aperture size preset by said diaphragm presetting means; and change-over means for selective actuation of said program exposure control circuit and said aperture priority automatic shutter speed control circuit, said change-over means actuating said program exposure control circuit when said first aperture information is transmitted, and actuating said aperture priority automatic shutter speed control circuit when said second aperture information is transmitted.

2. A lens exchangeable camera as defined in claim 1, wherein said aperture information transmitting means includes an engagement member movable to a position dependent on the value of the minimum aperture size of said exchangeable lens when said diaphragm presetting means is at the position to preset the minimum aperture size, and wherein said change-over means includes an engaging member engaged and moved by said engagement member only when said diaphragm presetting means is set to the position to preset the minimum aperture size.

3. A lens exchangeable camera as defined in claim 2, wherein said program exposure control circuit includes:
a light measuring circuit including means for generating a first signal and means for generating a second signal, said first signal being representative of a shutter speed which is optimum for the scene brightness with the aperture size of said diaphragm at the time of light measurement, and said second signal being representative of a shutter speed which is optimum for the scene brightness with the aperture size preset by said diaphragm presetting means;

means coupled with said engaging member for generating a third signal representative of a step difference from the minimum aperture size of said exchangeable lens to a specific aperture size with said diaphragm presetting means preset to the minimum aperture size;

a signal correction circuit for combining said second signal with said third signal to generate a fourth signal representative of an optimum shutter speed for the scene brightness with said specific aperture size;

a programmed shutter speed generating circuit for generating a fifth signal representative of a programmed shutter speed by dividing the difference between said fourth signal and a signal representative of a given reference shutter speed with a given ratio and by adding the divided difference to said fourth signal;

diaphragm control means including a comparator and an electromagnet, said comparator comparing said first signal with said fifth signal during the stopping-down of said diaphragm to generate a sixth signal when the difference between said first and fifth signals reaches a predetermined level, and said electromagnet being responsive to said sixth signal for stopping the stopping-down of said diaphragm to determine the aperture size; and a shutter speed control circuit for controlling the shutter speed in accordance with said first signal generated after the determination of the aperture size by said electromagnet.

4. A lens exchangeable camera as defined in claim 3, wherein said aperture priority automatic shutter speed control circuit commonly includes said means for generating a first signal and said shutter speed control circuit, said shutter speed control circuit controlling the shutter speed in accordance with said first signal generated after said diaphragm is stopped-down to the aperture size preset by said preset means when said diaphragm presetting means is at a position to preset an aperture size other than the minimum aperture size.

5. A lens exchangeable camera as defined in claim 4, wherein said signal correction circuit includes a change-over switch actuated by said engaging member and including a movable contact moved to a plurality of positions in dependence upon the position of said engaging member, and said means for generating said third signal operates in accordance with the positions of said movable contact.

6. A lens exchangeable camera as defined in any of claims 1-5, further comprising:
warning means for generating a warning signal when the scene brightness is out of the range permitting exposure control by said program exposure control circuit and wherein said change-over means includes a switch means for conditioning said warning means to be operable only when said first aperture information is transmitted.

* * * * *